United States Patent
Seki

(10) Patent No.: US 7,214,130 B2
(45) Date of Patent: May 8, 2007

(54) AIR PASSAGE OPENING AND CLOSING DEVICE AND AIR CONDITIONER FOR VEHICLE USE

(75) Inventor: Hideki Seki, Nagoya (JP)

(73) Assignee: DENSO Corporation, Kariya (JP)

( * ) Notice: Subject to any disclaimer, the term of this patent is extended or adjusted under 35 U.S.C. 154(b) by 110 days.

(21) Appl. No.: 11/186,078

(22) Filed: Jul. 21, 2005

(65) Prior Publication Data

US 2006/0030255 A1    Feb. 9, 2006

(30) Foreign Application Priority Data

Jul. 26, 2004    (JP)    ............................. 2004-217112

(51) Int. Cl.
   *B60S 1/54*    (2006.01)
   *B60H 1/22*    (2006.01)

(52) U.S. Cl. ...................................... 454/126; 454/160

(58) Field of Classification Search ................ 454/107, 454/121, 126, 132
   See application file for complete search history.

(56) References Cited

U.S. PATENT DOCUMENTS 5,743,380 A * 4/1998 Gauker ................... 200/43.08
6,351,169 B2 * 2/2002 Kuge ......................... 327/161
6,913,529 B2   7/2005 Seki
2001/0029759 A1* 10/2001 Baukholt et al. ............. 70/277
2004/0093884 A1* 5/2004 Seki et al. .................... 62/244

* cited by examiner

*Primary Examiner*—Josiah Cocks
*Assistant Examiner*—Helena Kosanovic
(74) *Attorney, Agent, or Firm*—Harness, Dickey & Pierce, PLC

(57) ABSTRACT

The blowing opening portions 20, 21, 22 and the communicating passage opening portion 27 are opened and closed by the first 25 and the second rotary door 26, the fork-shaped spring 41 is arranged close to an intermediate position between the door rotary shafts 25b, 26b, a spring force of one arm portion 41b of the fork-shaped spring 41 acts on the first rotary door 25 so that a load caused by the door self-weight can be canceled, and a spring force of the other arm portion 41c of the fork-shaped spring 41 acts on the second rotary door 26 so that a load caused by the door self-weight can be canceled. Due to the above structure, an increase in the door operating force caused by an influence of the door self-weight can be suppressed by a very simple structure.

11 Claims, 15 Drawing Sheets

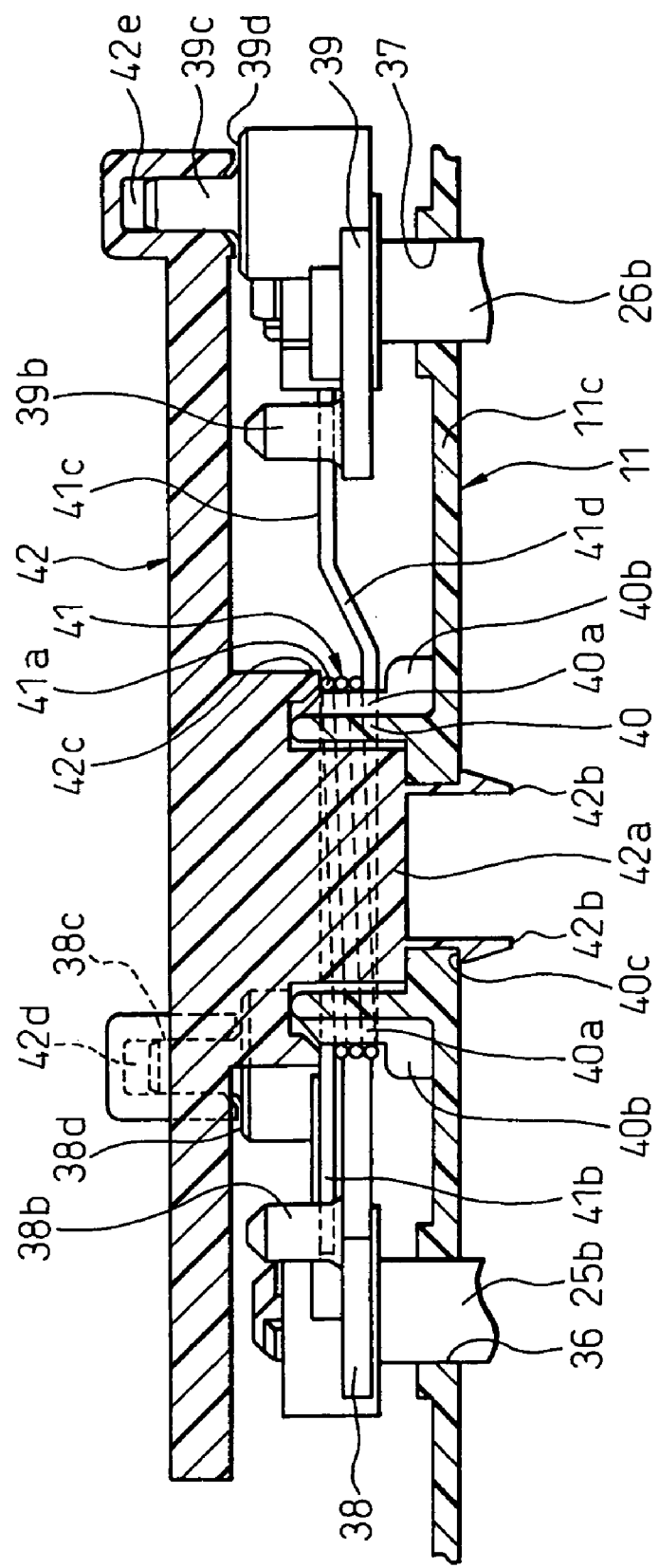

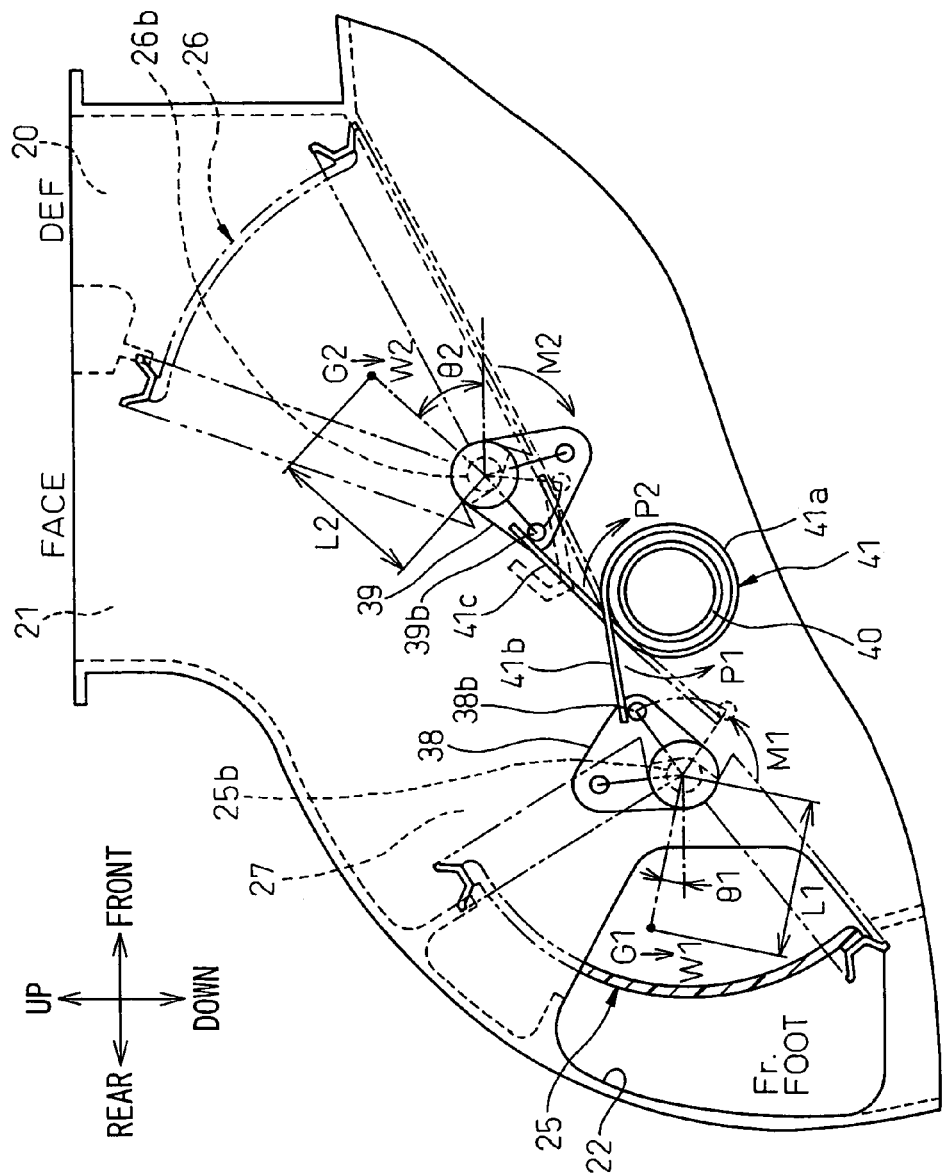

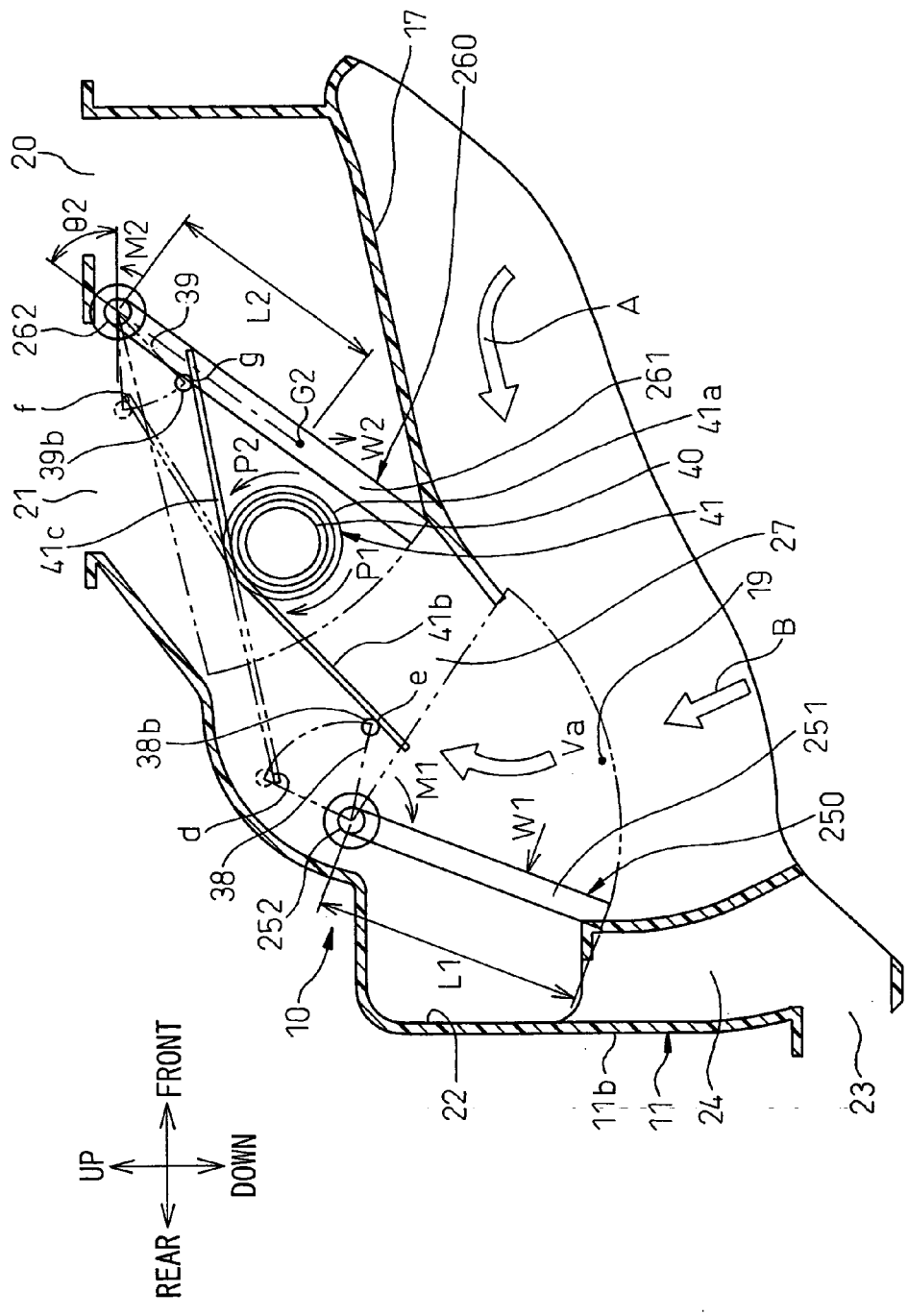

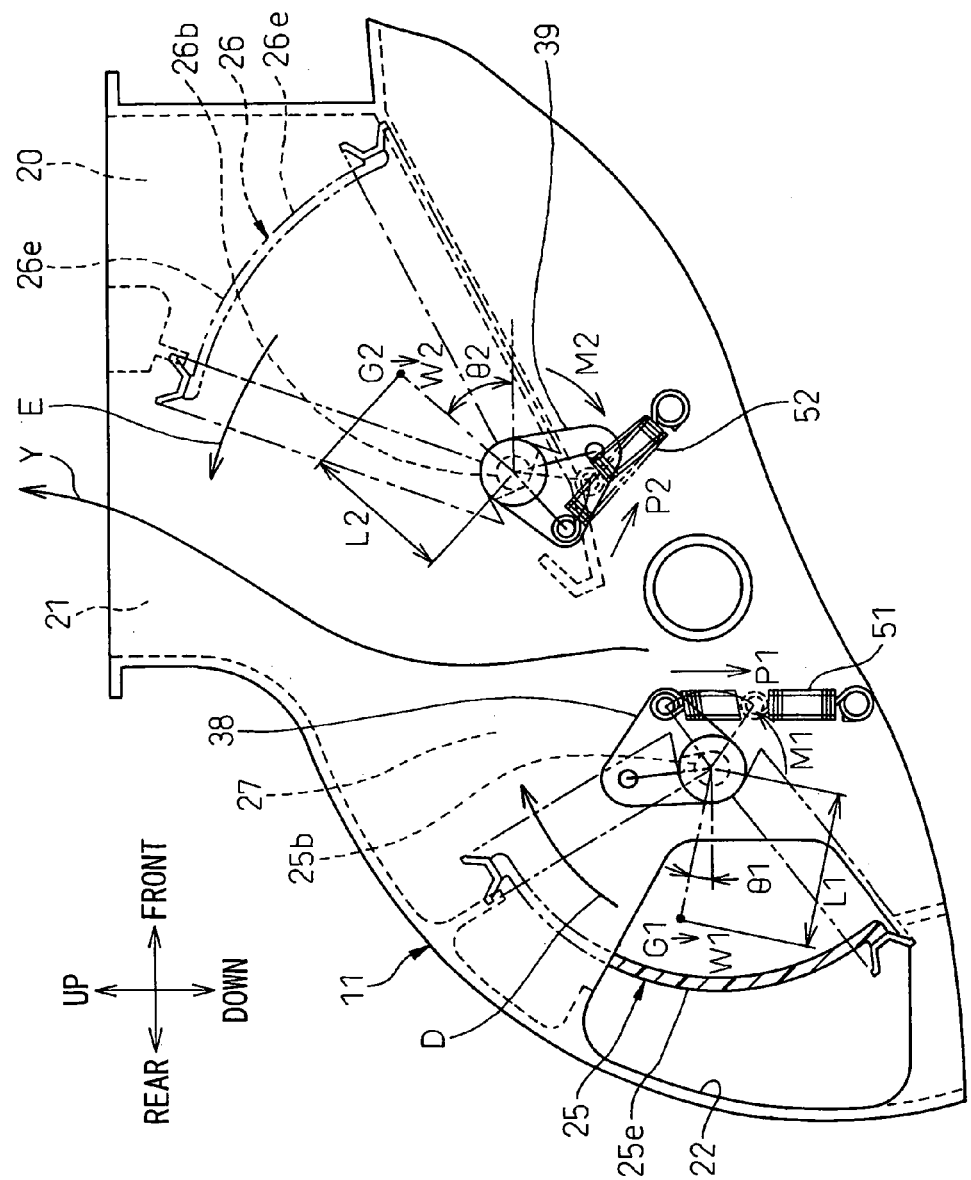

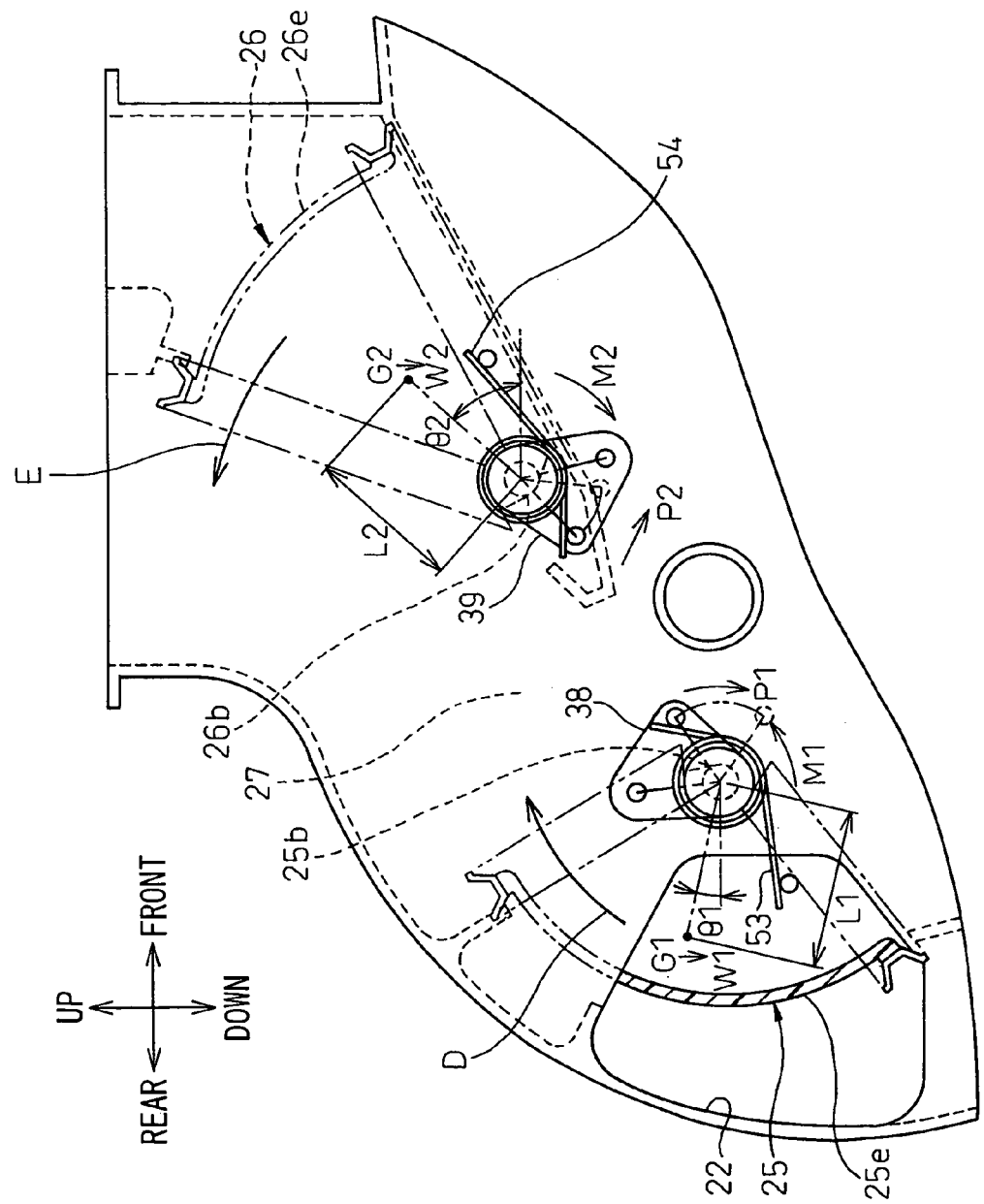

AIR PASSAGE OPENING AND CLOSING DEVICE AND AIR CONDITIONER FOR VEHICLE USE

BACKGROUND OF THE INVENTION

1. Field of the Invention

The present invention relates to an air passage opening and closing device for opening and closing an air passage by a rotatable door. The present invention also relates to an air conditioner for vehicle use into which the air passage opening and closing device is incorporated. More particularly, the present invention relates to a device preferably used for a blowing mode switching mechanism in an air conditioner for vehicle use.

2. Description of the Related Art

The present inventors have already proposed an air conditioner for vehicle use, having a blowing mode switching mechanism, shown in FIG. 13 of Japanese Patent Application No. 2003-122281. According to this prior art, there is provided a blowing mode switching mechanism for opening and closing a defroster opening portion 20, a face opening portion 21 and a foot opening portion 22, and two rotary doors 25, 26 are arranged in this blowing mode switching mechanism.

These two rotary doors 25, 26 are respectively rotated round the rotary shafts 25b, 26b. The outer circumferential door faces 25e, 26e are arranged in portions distant from the centers of these rotary shafts 25b, 26b in the radial direction. Both end portions of these outer circumferential door faces 25e, 26e in the axial direction are connected to the rotary shafts 25b, 26b.

Due to the above structure, the outer circumferential door faces 25e, 26e are rotated integrally with the rotary shafts 25b, 26b. The first rotary door 25, which is one of the two rotary doors 25, 26, is located on the upstream side of the air current and opens and closes an inlet passage of the front foot opening portion 22 and the rear foot opening portion not shown.

The second rotary door 26 located on the downstream side of the air current opens and closes the defroster opening portion 20 and the face opening portion 21. Further, by being linked with the foot opening portion 22, the first rotary door 25 opens and closes the communication passage opening portion 27 in the upstream portion of the second rotary door 26.

FIG. 13 is a view showing a state at the time of the face mode operation. The first rotary door 25 completely closes an inlet passage of the foot opening portion 22 and at the same time completely opens the communication passage opening portion 27. The second rotary door 26 completely closes the defroster opening portion 20 and at the same time completely opens the face opening portion 21. Due to the foregoing, a current of air flowing in the case 11 passes through the communication passage opening portion 27 and the face opening portion 21 as shown by arrow Y and blows out to the upper half of the passenger in the vehicle compartment.

In this connection, positions of the centers of gravity of the first 25 and the second rotary door 26 shown in FIG. 13 at the rotary positions are respectively G1 and G2. The door weights W1 and W2 act downward at these positions of the centers of gravity G1 and G2. As a result, the axial moments M1 and M2 act on the first 25 and the second rotary door 26 round the rotary shafts 25b, 26b.

Therefore, the following problems may be encountered. In the case where the first rotary door 25 and the second rotary door 26 are rotated in the directions D and E, which are reverse to the directions of the axial moments M1 and M2, an intensity of the force to operate the door is increased due to by the axial moments M1 and M2.

In order to solve the above problems, the present inventors made investigations as follows. As shown in FIG. 13, the coil-shaped tension springs 51, 52, which give the spring loads P1 and P2 in the directions reverse to the axial moments M1 and M2, are set at the driving levers 38, 39 connected to the rotary shafts 25b, 26b of the doors 25, 26.

The present inventors also made investigations as follows. As shown in FIG. 14, when the fork-shaped coil springs 53, 54 are respectively set corresponding to the levers 38, 39, the spring loads P1 and P2 in the direction reverse to the axial moments M1 and M2 are given to the levers 38, 39 of the doors 25, 26.

However, in the examples of the above investigations, the exclusively used springs are added corresponding to the doors 25, 26. Therefore, the number of parts is increased. Accordingly, the assembling property is deteriorated.

In this connection, in FIGS. 13 and 14, the door means for opening and closing the air passage is composed of the rotary doors 25, 26, the outer circumferential door faces 25e, 26e of which rotate in the direction perpendicular to the air flow, and these outer circumferential door faces 25e, 26e are distant from the centers of the rotary shafts 25b, 26b by a predetermined distance. However, in the case where the door means for opening and closing the air passage is composed of a cantilever plate door, the rotary shaft of which is arranged at the end portion of the plate door body, the following problem may be encountered. As the plate door body is rotated while resisting the wind pressure generated by the air flow, the intensity of the door operating force is increased by the wind pressure.

SUMMARY OF THE INVENTION

In view of the above points, it is an object of the present invention to suppress an increase in the intensity of the door operating force, which is caused by the door self-weight or the wind pressure generated by the air flow, by one spring means.

In order to accomplish the above object, an air passage opening and closing device of the present invention includes:

a plurality of air passages (20 to 23, 27); and two air passage opening and closing doors (25, 26, 250, 260) capable of rotating round rotary shafts (25a, 25b, 26a, 26b, 252, 262) for opening and closing the plurality of air passages (20 to 23, 27), wherein a fork-shaped spring means (41) is arranged in a neighborhood of an intermediate position of each rotary shaft (25a, 25b, 26a, 26b, 252, 262), a spring load given to one (41b) of the arm portions of the fork-shaped spring means (41) acts on one (25, 250) of the two air passage opening and closing doors so that a door self-weight or a load generated by wind pressure can be canceled, and a spring load given to the other (41c) of the arm portions of the fork-shaped spring means (41) acts on the other (26, 260) of the two air passage opening and closing doors so that a door self-weight or a load generated by wind pressure can be canceled.

According to the above constitution, when only one fork-shaped spring means (41) having two arm portions (41b, 41c) is used, it is possible to cancel the self-weights of the two doors and the loads generated on the two doors by wind pressure. Accordingly, it is possible to suppress an increase in the intensity of the door operating force, which is caused by the door self-weight and the wind pressure, by a simple structure. Accordingly, it is possible to provide practical advantages such as a reduction of the number of parts of the air passage opening and closing device and a decrease in the time required to assemble the device.

According to the present invention, an air passage opening and closing device includes: two levers (38, 39), which are respectively connected to rotary shafts (25a, 25b, 26a, 26b, 252, 262) of the two air passage opening and closing doors (25, 26, 250, 260), to rotate the two air passage opening and closing doors (25, 26, 250, 260); and two pins (38b, 39b) respectively attached to the two levers (38, 39), wherein one arm (41b) is contacted with one (38b) of the two pins and the other arm (41c) is contacted with the other (39b) of the two pins, and when the two pins (38b, 39b) are rotated in accordance with the rotation of the two levers (38, 39), the one and the other arm (41b, 41c) are pushed and elastically deformed so that the spring load can be generated.

Due to the above constitution, each arm portion (41b, 41c) is only contacted with each pin (38b, 39b) and elastically deformed being pushed by each pin (38b, 39b). That is, as each arm portion (41b, 41c) is not fixed to each pin (38b, 39b), each arm portion (41b) is not forcibly deformed when each pin (38b, 39b) is displaced by being rotated. Therefore, a relative sliding displacement can be accomplished at the contact point of each arm portion (41b, 41c) with each pin (38b, 39b). Due to the foregoing, each arm portion (41b, 41c) can smoothly generate a spring load without causing a faulty operation of the lever (38, 39).

In the present invention, an air passage opening and closing device includes a link plate (42) commonly used for giving a rotary operating force to the two levers (38, 39), wherein a rotary shaft (42a) of the link plate (42) is arranged concentrically with a circular coil portion (41a) of the fork-shaped spring means (41).

Due to the foregoing, the fork-shaped spring means (41) can be arranged in an arrangement space on the link plate (42) and space can be saved.

In the present invention, in an air passage opening and closing device, a cylindrical attaching boss portion (40) is provided in a case (11) in which the plurality of air passages (20 to 23, 27) are formed and the two air passage opening and closing doors (25, 26, 250, 260) are built, a rotary shaft (42a) of the link plate (42) is pivotally attached to the inner circumference of the attaching boss portion (40), and the circular coil portion (41a) is attached to the outer circumference of the attaching boss portion (40).

Due to the foregoing, one cylindrical attaching boss portion (40), which is provided in the case (11), can be commonly used as an attaching portion to which both the link plate (42) and the fork-shaped spring means (41) are attached.

In an air passage opening and closing device of the present invention, the case (11) is made of resin and the attaching boss portion (40) is formed integrally with the case (11).

Due to the foregoing, the attaching boss portion (40) can be simply formed by means of integral molding with resin. Further, since only one attaching boss portion (40) is formed, which can be used as an attaching means for attaching both the link plate (42) and the fork-shaped spring means (41), the shape of the case (11) made of resin can be simplified, and the manufacturing cost of manufacturing the metallic mold for molding can be reduced.

In an air passage opening and closing device of the present invention, one end portion side in the axial direction of the circular coil portion (41a) is supported by a root portion of the attaching boss portion (40), and the other end portion side in the axial direction of the circular coil portion (41a) is supported by the spring presser portion (42c) formed on the link plate (42).

Due to the foregoing, the link plate (42) can be also used as an attaching means for attaching the fork-shaped spring means (41). Accordingly, an attaching means exclusively used for the fork-shaped spring means (41) is not needed.

In an air passage opening and closing device of the present invention, the step portion (41d) for correcting a dislocation of the drawing position of both arm portions (41b, 41c) in the axial length of the circular coil portion (41a) is formed in one (41c) of both arm portions (41b, 41c).

Due to the foregoing, at the same position with respect to the axial direction (in other words, in the axial direction of the door rotary shaft) of the circular coil portion (41a), both arm portions (41b, 41c) can be contacted with the pins (38b, 39b) of the levers (38, 39). Due to the foregoing, the shapes of the two levers (38, 39) can be made the same.

In an air passage opening and closing device of the present invention, the two air passage opening and closing doors are composed of rotary doors (25, 26) which respectively have an outer circumferential door face (25e, 26e) located at a position distant by a predetermined distance from the center of the rotary shaft (25a, 25b, 26a, 26b) to the outside in the radial direction, and the outer circumferential door face (25e, 26e) rotates in the direction perpendicular to the air current.

In the case where the air passage opening and closing door is composed of the rotary door (25, 26), the outer circumferential door face (25e, 26e) of which is rotating in the direction perpendicular to the air current, an increase in the operating force caused by the self-weights of the two rotary doors (25, 26) can be effectively suppressed by the fork-shaped spring means (41).

In an air passage opening and closing device of the present invention, the two air passage opening and closing doors may be respectively composed of a cantilever plate door (250, 260) of which the rotary shaft (252, 262) arranged at an end portion of the plate door body portion (251, 262).

In the case where the cantilever plate door is used as described above, and as exemplarily shown in FIG. 12 described later, an intensity of the door operating force is increased by both the wind pressure and the door self-weight. However, this increase caused by both the wind pressure and the door self-weight can be effectively suppressed by the fork-shaped spring means (41).

According to the present invention, an air conditioner for vehicle use comprises an air passage opening and closing device, wherein the air passage opening and closing device includes a plurality of blowing opening portions (20 to 23) from which air is blown out to different portions in a vehicle compartment, and the two air passage opening and closing doors are composed as blowing mode doors to open and close the plurality of the blowing opening portions (20 to 30).

Due to the foregoing, an increase in the operating force of operating the blowing mode door of the air conditioner for vehicle use can be effectively suppressed by the fork-shaped spring means (41).

In this connection, reference numerals in the parentheses in each means described above correspond to the specific means in the embodiment described later.

The present invention may be more fully understood from the description of preferred embodiments of the invention, as set forth below, together with the accompanying drawings.

BRIEF DESCRIPTION OF THE DRAWINGS

In the drawings:

FIG. 5 is a sectional view showing a state of assembling of the blowing mode switching mechanism portion of the first embodiment;

FIG. 6A is a schematic illustration showing a relation between the load, which is generated by the rotary door self-weight, and the spring load at the time of the face mode shown in FIG. 1.

FIG. 12 is a sectional view showing a primary portion of the air conditioning unit in the second embodiment, wherein this view shows a state in the face mode;

FIG. 13 is a sectional view showing a primary portion of the air conditioning unit of an example into which the investigations were made by the present inventors; and FIG. 14 is a sectional view showing a primary portion of the air conditioning unit of another example into which the investigations were made by the present inventors.

DESCRIPTION OF THE PREFERRED EMBODIMENTS

First Embodiment

Figure 1:
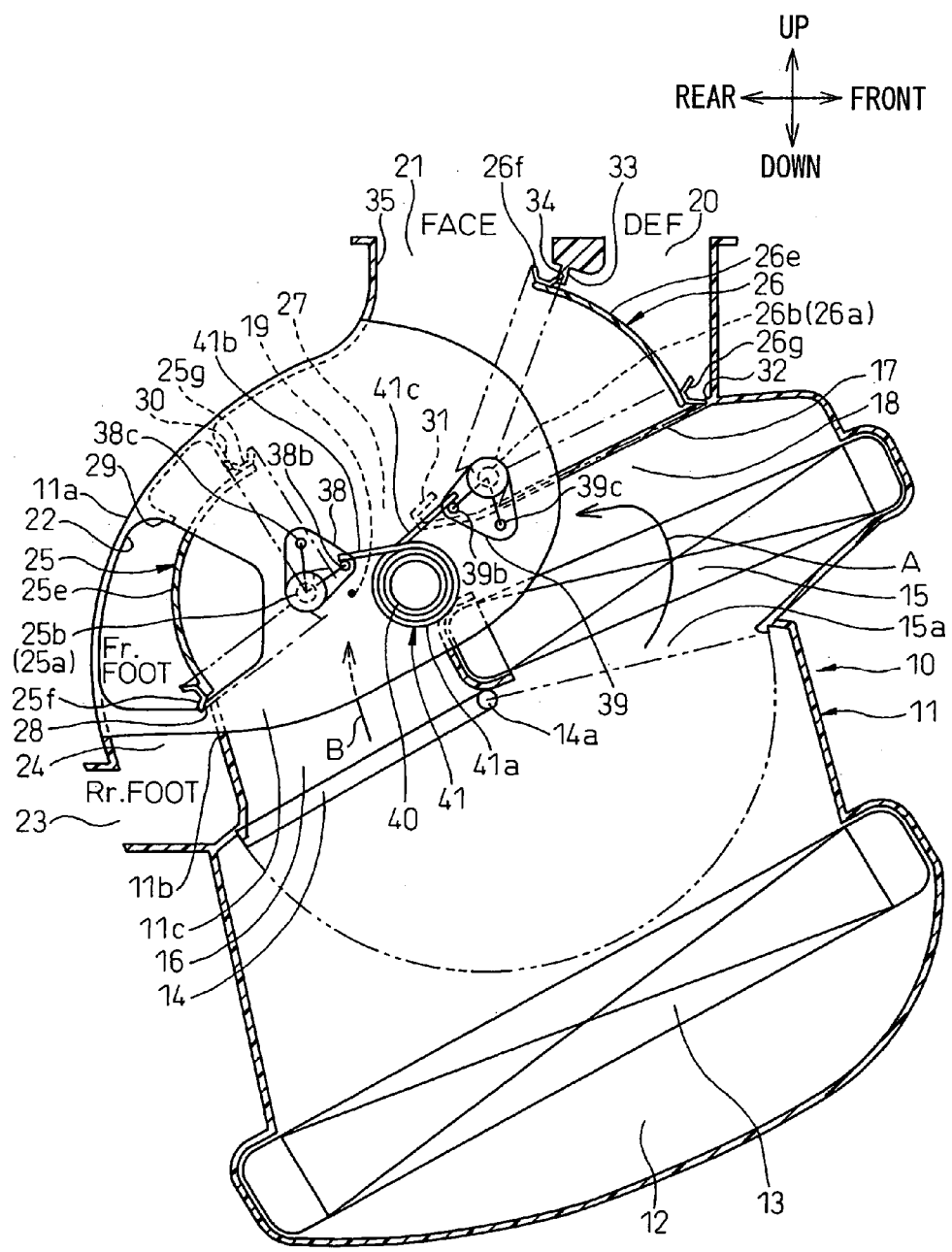
FIG. 1 is a sectional view showing an outer appearance of a portion of the air conditioning unit of the first embodiment of the present invention wherein this view shows the state in the face mode.

FIG. 1 is a view showing an air conditioning unit 10 to accommodate a heat exchange portion which is in an indoor unit portion in an air conditioning device for vehicle use of the first embodiment. In this connection, FIG. 1 is a sectional view showing an outer appearance of only the blowing mode switching mechanism.

This air conditioning unit 10 is arranged at the substantially central portion in the lateral direction (the width direction) of a vehicle inside the instrument panel (not shown) arranged in the front portion of the vehicle compartment. In this connection, the arrows of up, down, right and left shown in FIG. 1, indicate the directions when the device is mounted on a vehicle.

The interior unit portion of the air conditioning device for vehicle use is roughly divided into an air conditioning unit 10, which is arranged in the substantially central portion, and a blower unit, not shown, which is arranged on the assistant driver's side is offset.

The blower unit includes: an inside and outside air switching box for switching between the outside air (air outside the vehicle compartment) and the inside air (air inside the vehicle compartment); and a centrifugal blower for blowing air introduced into this inside and outside air switching box. A blast of air sent out from this blower unit flows into the air flowing space 12 at the lowermost portion in the case 11 of the air conditioner unit 10.

The case 11 is made of an elastic resin, the mechanical strength of which is high, such as polypropylene, and is formed by means of molding. In order to easily release the case 11 from the mold in the process of molding and further in order to easily assemble the air conditioner device into the case 11, the case 11 is formed by means of molding under the condition that the case is divided into a plurality of split cases. After that, the thus divided split cases are fastened to each other into one body.

In the case 11 of the air conditioner unit 10, the evaporator 13, which is a heat exchanger used for cooling, is arranged in an upper portion of the air flowing space 12 in the substantially horizontal direction being inclined by a small inclination angle. Accordingly, after a flow of air, sent out from the blower unit, has flowed into the air flowing space 12, it passes through the evaporator 13 upward from this space 12. As well known, a refrigerant at low pressure, the pressure of which has been reduced by a decompressing device such as an expansion valve of the refrigerating cycle used for air conditioning, flows into the evaporator 13, and this refrigerant at low pressure absorbs heat from the flow of air and evaporates.

In the upper portion (on the downstream side of the air flow) of the evaporator 13, the air mixing door 14 and the hot-water-type heater core 15 composing a heat exchanger for heating are arranged. In this case, the air mixing door 14 is composed of a cantilever plate rotated round the rotary shaft 14a.

As is well known, the heater core 15 heats air by the heat of hot water used for cooling the vehicle engine. This heater core 15 is also arranged in a substantially horizontal direction, that is, this heater core 15 is also arranged substantially parallel with the evaporator 13.

The size of the heater core 15 is smaller than the sectional area of the passage in the case 11, and the heater core 15 is arranged in the case 11 on the front side of the vehicle. Due to the above arrangement, the cold air passage 16, in which a flow of cold air bypassing the heater core 15 flows, is formed on the rear side of the heater core 15 (on the passenger's seat side).

The air mixing door 14 rotates between the evaporator 13 and the heater core 15 in the longitudinal direction of the vehicle and opens and closes the inlet air passage 15a of the heater core 15 and the cold air passage 16. Due to the foregoing, a ratio of the air volume of the hot air (shown by arrow A), which passes in the heater core inlet air passage 15a and is heated, to the air volume of the cold air (shown by arrow B), which passes in the clod air passage 16, is adjusted, so that the temperature of the air blowing out into the vehicle compartment can be adjusted. Accordingly, the temperature adjusting means for adjusting the temperature of the flow of air into the vehicle compartment can be adjusted by the air mixing door 14.

In this connection, the rotary shaft 14a of the air mixing door 14 is pivotally supported by the bearing holes (not shown) provided on the right and the left side wall portion of the case 11. Further, one end portion of the rotary shaft 14a is protruded outside the case 11 and connected to an air mixing door operating mechanism. Concerning this air mixing door operating mechanism, a manual operating mechanism, which is manually operated by a passenger, may be used. Alternatively, an actuator mechanism, into which a motor is incorporated, may be used.

In the upper portion of the heater core 15, the hot air guide wall 17 is formed integrally with the case 11 being separated from the heater core 15 by a predetermined interval. The hot air passage 18 is formed between this hot air guide wall 17 and the upper face of the heater core 15. Hot air passing through the heater core 15 is guided by the hot air guide wall 17 and flows in the hot air passage 18 to the rear side of the vehicle as shown by arrow A.

The air mixing portion 19, in which hot air A flowing in this hot air passage 18 to the rear side of the vehicle and cold air B rising in the cold air passage 16 are mixed with each other, is formed in the upper portion of the cold air passage 16.

The defroster opening portion 20 is open in a portion of the upper face portion of the case 11 on the front side of the vehicle, and the face opening portion 21 is open in a portion of the upper face portion of the case 11 on the rear side of the vehicle of the defroster opening portion 20. Both the defroster opening portion 20 and the face opening portion 21 are rectangular. More particularly, the sides in the lateral direction of the vehicle are long sides, and the sides in the longitudinal direction of the vehicle are short sides.

In this case, the conditioned air sent from the air mixing portion 19 is blown out from the defroster opening portion 20 toward the inner face of the windshield of the vehicle via the defroster duct not shown. The conditioned air sent from the air mixing portion 19 is blown out from the face opening portion 21 toward the upper half of the passenger via the face duct not shown.

The front foot opening portion 22 is open in the side wall portions on both sides of the vehicle of the case 11. More specifically, in the side wall portions on both sides of the case 11, that is, in the portions of the side wall portions adjacent to the rear side wall face 11a, and at positions close to the air mixing portion 19 with respect to the vertical direction of the vehicle, the front foot opening portions 22 are open. The conditioned air is blown out from the right and the left front foot opening portion 22 to the foot portions of the passengers (the driver and the passenger) seated in the front seats.

The rear foot opening portion 23 is arranged on the lower side of the front foot opening portion 22 and on the wall face 11a of the case 11 on the rear side of the vehicle. The conditioned air sent from the air mixing portion 19 is blown out from the rear foot opening portion 23 toward the foot portion of the passenger seated in the rear seat.

The rear foot opening portion 23 and the front foot opening portion 22 are always communicated with each other by the rear foot passage 24. This rear foot passage 24 is formed between the wall face 11a of the case 11 on the rear side of the vehicle and the cold air passage wall face 11b located inside (on the front side of the vehicle) of this wall face 11a.

In this embodiment, the blowing mode switching mechanism is composed of the two rotary doors 25, 26. One is the first rotary door 25 and the other is the second rotary door 26. The inlet passages of the front foot opening portion 22 and the rear foot opening portion 23 are opened and closed by the first rotary door 25, and the defroster opening portion 20 and the face opening portion 21 are opened and closed by the second rotary door 26.

In this connection, inside the case 11, the communication passage opening portion 27 is formed adjacent to the front side of the vehicle of the front foot opening portion 22, and the defroster opening portion 20 and the face opening portion 21 are communicated with the air mixing portion 19 via this communicating passage opening portion 27. The first rotary door 25 also opens and closes this communicating passage opening portion 27 when the inlet passages of both the foot opening portions 22, 23 are opened and closed.

Although the sizes of the first 25 and the second rotary door 26 are different from each other, the door structures are essentially the same. Therefore, the first rotary door 25 is taken as an example and a specific example of the rotary door structure will be explained by referring to FIG. 2. In this connection, reference numerals of the second rotary door 26 are shown in the parentheses in FIG. 2.

Specific explanations of the second rotary door 26 are omitted here. The first rotary door 25 includes: a right 25a and a left rotary shaft 25b; a right 25c and a left sector-shaped side plate portion 25d; and an outer circumferential door face 25e, wherein these components are integrated with each other into one body.

The right 25a and the left rotary shaft 25b protrude outside at the centers of the sector-shapes of the right 25c and the left side plate portion 25d and pivotally supported by the side wall portions 11c on both sides of the case 11.

When the outer circumferential door face 25e is connected to the right 25c and the left sector-shaped side plate portion 25d, the right 25c and the left sector-shaped side plate portion 25d and the outer circumferential door face 25e compose a gate-shape (a U-shape). The inner space of this gate-shape is always open to the space in the case 11. Therefore, air can be freely circulated in the inner space of the gate-shape in the direction of arrow C (the direction perpendicular to the rotary shaft direction).

The outer circumferential door face 25e is located in a portion distant from the centers of the rotary shafts 25a, 25b in the radial direction of the rotary shafts 25a, 25b by a predetermined distance and extends in the door rotary direction so that a predetermined wall area can be formed by the outer circumferential door face 25e. More particularly, the outer circumferential door face 25e of this embodiment is formed into an arcuate sectional shape round the rotary shafts 25a, 25b as shown in FIG. 1. The shape of the upper face of the outer circumferential door face 25e is formed into a substantial rectangle in which the lateral direction of the vehicle is a long side and the longitudinal direction of the vehicle is a short side.

In this connection, even when the sectional shape of the outer circumferential door face 25e is not formed into an arcuate shape but formed into a flat plate shape, it is possible to exhibit the passage opening and closing function.

The first rotary door 25 includes: the rotary shafts 25a, 25d; the sector-shaped side plate portions 25c, 25d; and the outer circumferential door face 25e. The entire first rotary door 25 is made of elastic resin such as polypropylene, the mechanical strength of which is high, by means of integral molding.

Next, the sealing structure of the first rotary door 25 will be explained below. In order to reduce an intensity of the door operating force, the door sealing structure of the lip sealing type is employed. The first sealing portion 25f is stuck to a portion on the front foot opening portion 22 on the peripheral portion surface of the outer circumferential door face 25e and the side plate portions 25c, 25d composing the door base plate portion, and the second sealing portion 25g is stuck to a portion on the communication passage opening portion 27 side.

Figure 2:
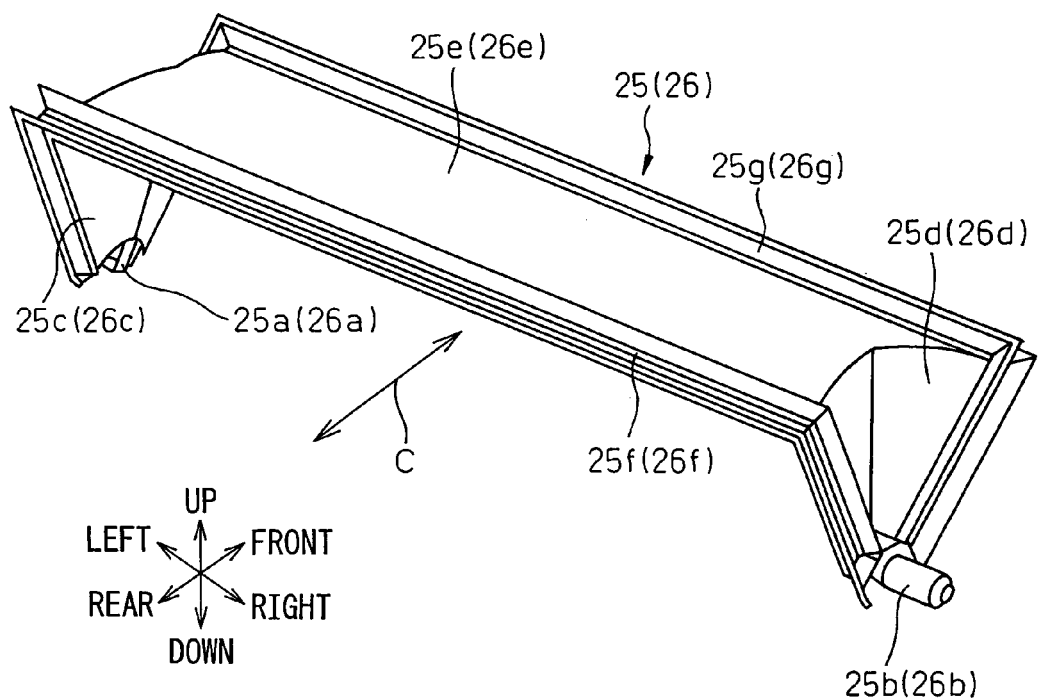
FIG. 2 is a perspective view exemplarily showing a rotary door structure of the first embodiment.

Both the sealing portions 25f, 25g are respectively composed of an elastic body and protruded from the door peripheral portion surface to the outside in a lip shape (like a thin sheet), wherein the sections of the sealing portions 25f, 25g are formed into a substantial V-shape. As shown in FIG. 2, when a view is taken in the air flowing direction C inside the rotary door 25, the entire shapes of both the sealing portions 25f, 25g are formed into a gate shape (U-shape) in the same manner as that of the entire shape of the rotary door 25.

Concerning the specific material of both the sealing portions 25f, 25g, when the thermoplastic elastomer, which can be formed at a high temperature like a thermoplastic resin and which shows a rubber elasticity at a normal temperature, is used, both sealing portions 25f, 25g can be integrally formed at the time of forming the door base plate portion of the first rotary door 25.

The second rotary door 26 of this embodiment also includes the portions 26a to 26g corresponding to the portions 25a to 25g of the first rotary door 25 described above, that is, the structure of the second rotary door 26 of this embodiment is the same as that of the first rotary door 25.

Next, explanations will be made into the sealing faces 28 to 35 on the case side with which the sealing portions 25f, 25g, 26f, 26g of the first 15 and the second rotary door 26 come into pressure contact. On the inner wall of the case 11, the foot side sealing faces 28, 29 are provided at the upper and lower positions of the front foot opening portion 22, and the communicating passage side sealing faces 30, 31 are provided at the front and rear positions of the communicating passage opening portion 27.

On the inner wall of the case 11, the defroster side sealing faces 32, 33 are provided at the front and rear positions of the defroster opening portion 20, and the face side sealing faces 34, 35 are provided at the front and rear positions of the face opening portion 21.

The sealing faces 28, 29, 30, 31 on the foot side and the communicating passage side are formed into a gate shape corresponding to the gate shape of the sealing portions 25f, 25g of the first rotary door 25. The sealing portions 25f, 25g of the first rotary door 25 are elastically deformed and come into pressure contact with these sealing faces 28 to 31.

In the same manner, the sealing faces 32, 33, 34, 35 on the defroster side and the face side are formed into a gate shape corresponding to the gate shape of the sealing portions 26f, 26g of the second rotary door 26. The sealing portions 26f, 26g of the second rotary door 26 are elastically deformed and come into pressure contact with these sealing faces 32 to 35.

Figure 3:
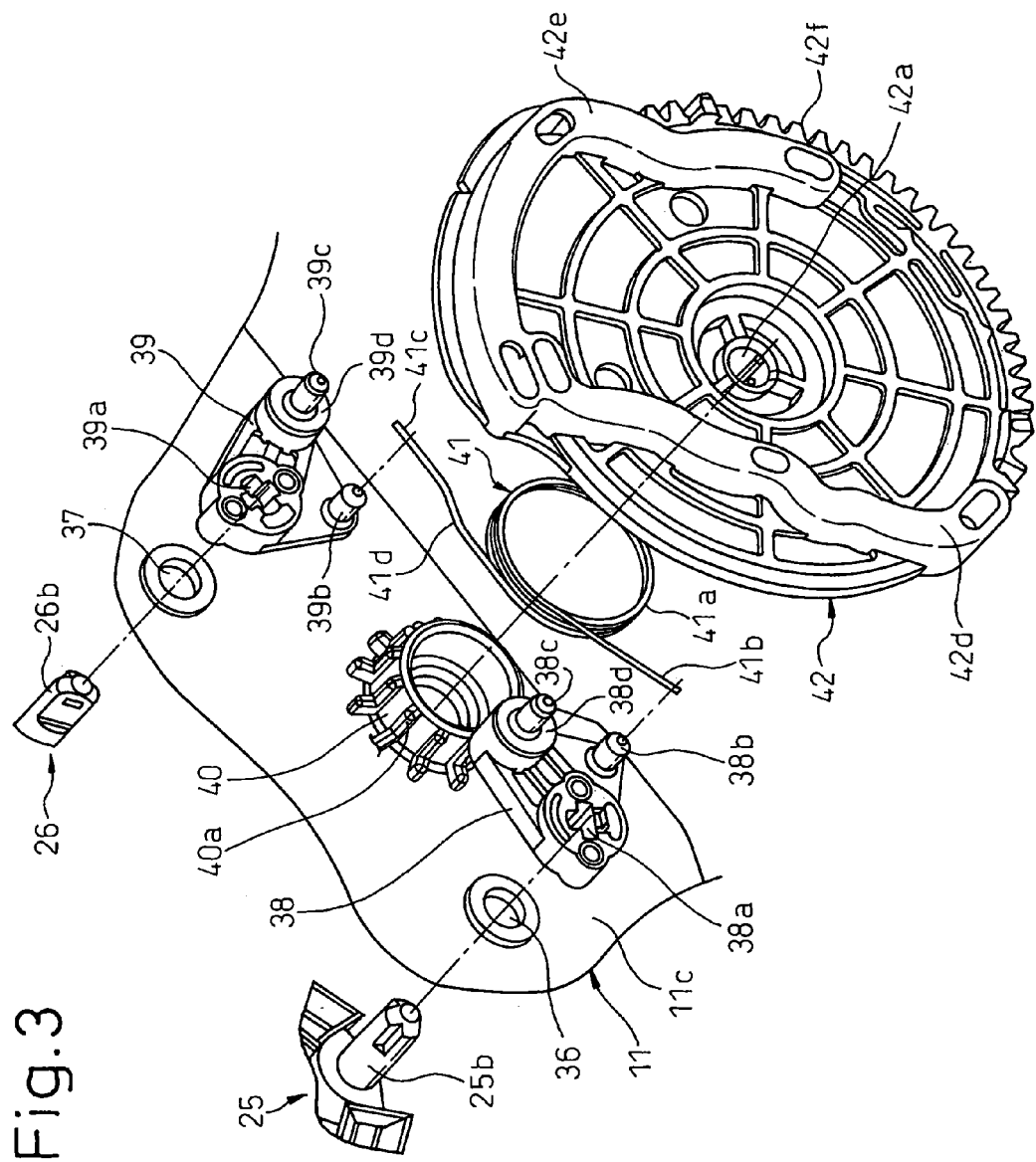
FIG. 3 is an exploded perspective view showing a blowing mode switching mechanism portion of the first embodiment.
Figure 4:
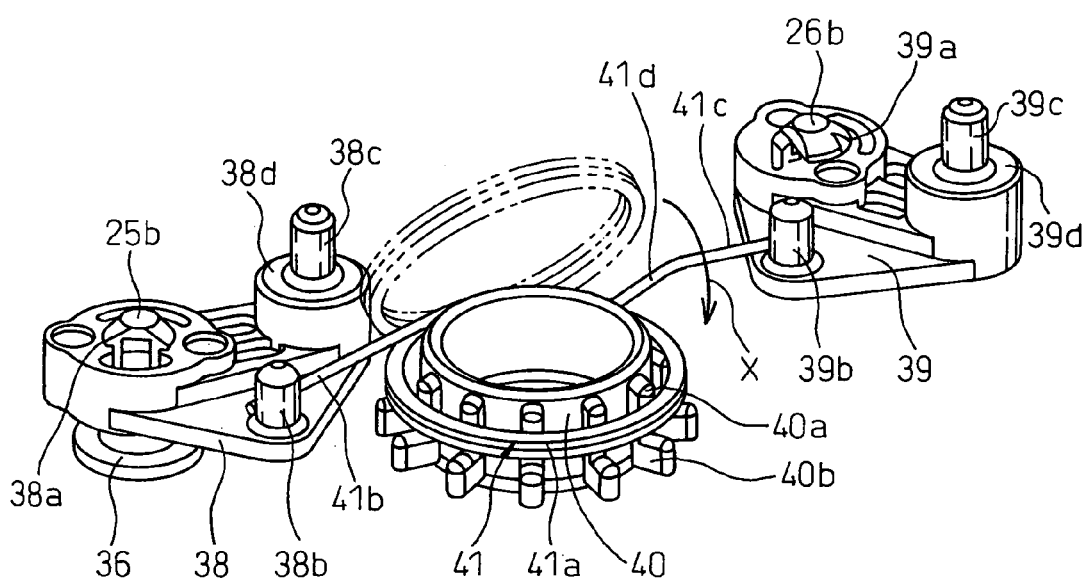
FIG. 4 is a perspective view showing a state of assembling of the primary portion of FIG. 3.

Next, referring to FIGS. 3 to 5, explanations will be made into the specific structure of the blowing mode switching mechanism which is a characteristic portion of the present embodiment. FIG. 3 is an exploded perspective view showing a blowing mode switching mechanism portion of the first embodiment, FIG. 4 is a perspective view showing a state during assembly of the primary portion of FIG. 3, and FIG. 5 is a sectional view showing a state during assembly of the blowing mode switching mechanism portion of the first embodiment.

The side wall portion 11c of the case 11 shown in FIGS. 3 and 5 is the side wall portion 11c on the right of the vehicle, the outer appearance of which is shown in FIG. 1. In this side wall portion 11c, the bearing holes 36, 37 are respectively formed to correspond to the rotary shafts 25b, 26b of the first 25 and the second rotary door 26. The rotary shafts 25b, 26b are pivotally supported by the respective bearing holes 36, 37, and the forward end portions of the rotary shafts 25b, 26b are protruded outside the case side wall portion 11c.

At each of the forward end portions of the rotary shafts 25b, 26b, the same detent shape composed of a non-circular shape is formed. In the levers 38, 39, the non-circular shaft fixing holes 38a, 39a corresponding to the forward end detent shapes of the rotary shafts 25b, 26b are formed. When the forward end portions of the rotary shafts 25b, 26b are engaged with these shaft fixing holes 38a, 39a so that the rotary shafts 25b, 26b can not be rotated in the shaft fixing holes 38a, 39a, the rotary shafts 25b, 26b are integrally fixed to the levers 38, 39.

Both the levers 38, 39 are triangular plate members made of resin. In this embodiment, the shapes of both the levers 38, 39 are the same. In both the levers 38, 39, the shaft fixing holes 38a, 39a are respectively formed in the neighborhood of the top of the triangular plate member. In the neighborhoods of the other two tops, the pushing pins 38b, 39b and the driving pins 38c, 39c are integrally formed respectively. All of these pins 38b, 39b, 38c, 39c are formed in such a manner that the pins are protruded outside the case side wall portion 11c from both levers 38, 39.

On the other hand, in the case side wall portion 11c, the attaching boss 40 is provided in the neighborhood of the intermediate portion of the two bearing holes 36, 37 (the two door rotary shafts 25b, 26b). This attaching boss 40 is formed into a cylindrical shape and integrated into one body with the case side wall portion 11c so that it can protrude outside the case side wall portion 11c.

This attaching boss 40 functions as an attaching portion of attaching the fork-shaped spring 41 and also functions as an attaching portion for attaching the blowing mode link plate 42.

The fork-shaped spring 41 includes: a circular coil portion 41a engaged with the outer circumferential cylindrical face of the attaching boss 40; and arm portions 41b, 41c for holding pins. These arm portions 41b, 41c are protruded from the circular coil portion 41a in the directions opposite to each other. One arm portion 41b is linearly drawn out in the tangential direction of the circular coil portion 41a. However, the other arm portion 41c is drawn out, while being curved, and the step portion 41d, described later, is included in the arm portion 41c.

On the outer circumferential face of the attaching boss 40, a large number of ribs 40a extending in the axial direction of the cylindrical shape are formed in the circumferential direction of the cylindrical shape at regular intervals. The large number of ribs 40a are provided so that the inner diameter of the circular coil portion 41a can be larger than the outer diameter of the attaching boss 40 by a predetermined value. In the recessed portions formed between the large number of ribs 40a, resin is not filled in the process of resin molding. In this connection, each rib 40a is formed into an L-shape, and the bottom portion (the root portion) 40b of the L-shape supports one end portion in the axial direction of the circular coil portion 41a (the lower end portion shown in FIGS. 4 and 5).

The circular coil portion 41a of the fork-shaped spring 41 is engaged with the outer circumferential cylindrical face of the attaching boss 40 from the position indicated by the two-dotted chain line in FIG. 4 as shown by arrow X. At this time, the arm portions 41b, 41c of both end portions of the circular coil 41a are only contacted with the outer circumferential surfaces of the pushing pins 38b, 39b of both levers 38, 39, that is, the arm portions 41b, 41c of both end portions of the circular coil 41a only collide with the outer circumferential surfaces of the pushing pins 38b, 39b of both levers 38, 39.

The reason is that the contact positions of the pushing pins 38b, 39b with the arm portions 41b, 41c can be changed according to the rotary displacement of both levers 38, 39.

On the other hand, the blowing mode link plate 42 is a disk-shaped member made of resin. At its center, the rotary shaft 42a is integrally formed. This rotary shaft 42a is pivotally engaged with the inner circumference of the cylindrical attaching boss 40.

At the forward end portion of the rotary shaft 42a, a plurality of engaging pawls 42b (for example, three engaging pawls 42b) are protruded. When these engaging pawls 42b are elastically engaged with the end face 40c of the hole portion of the attaching boss 40, the blowing mode link plate 42 can be attached to the attaching boss 40.

On the blowing mode link plate 42, the annular spring presser portion 42c, the diameter of which is larger than the outer diameter of the rotary shaft 42a, is integrally formed at the root portion of the rotary shaft 42a. By this annular spring presser portion 42c, the other end portion (the upper end portion shown in FIGS. 4 and 5) in the axial direction of the circular coil 41a of the fork-shaped spring 41 is supported. Accordingly, by utilizing the blowing mode link plate 42 itself, the fork-shaped spring 41 can be attached to the attaching boss 40 without using an exclusive attaching member.

As shown in FIG. 5, in the fork-shaped spring 41, according to the size in the axial direction of the circular coil portion 41a, the drawing position of the right arm portion 41c is lower than the drawing position of the left arm portion 41b. Therefore, in order to correct this dislocation of the drawing position of the right arm 41c, the step portion 41d is formed, so that the positions on the forward end side of the right and the left arm portion 41b, 41c can be made to be the same with respect to the axial direction of the spring. Due to the foregoing, the shape of the lever 38 can be made to be the same as the shape of the lever 39.

On the blowing mode link plate 42, the first 42d and the second cam groove 42e are formed. As shown in FIG. 5, the sectional shapes of the first 42d and the second cam groove 42e are formed into a recessed shape open to the case side wall portion 11c. As shown in FIG. 3, the first 42d and the second cam groove 42e are formed in such a manner that they are slenderly extending along the substantially circumferential direction in the neighborhood of the outer edge portion of the blowing mode link plate 42.

The drive pin 38c of the lever 38 is slidably engaged with the inside of the first cam groove 42d, and the drive pin 39c of the lever 39 is slidably engaged with the inside of the second cam groove 42e. In the root portions of the drive pins 38c, 39c, the columnar support portions 38d, 39d, the outer diameters of which are larger than the outer diameters of the drive pins 38c, 39c, are formed. The blowing mode plate 42 is supported and rotated on these support portions 38d, 39d.

In this case, when the heights of the spring pushing pins 38b, 39b of the levers 38, 39 are made to be a little smaller than the heights of the supporting portions 38d, 39d as shown in FIG. 5, the spring pushing pins 38b, 39b do not obstruct the rotation of the blowing mode link plate 42.

The gear 42f is formed in the outer circumferential edge portion of the blowing mode link plate 42. When this gear 42f is meshed with a gear of the blowing mode door operating mechanism not shown, the blowing mode link plate 42 is given a rotary operation force. Concerning this blowing mode door operating mechanism, this embodiment employs a manual operation mechanism to which an operation force is given by the manual operation of a driver. In this connection, concerning this blowing mode door operating mechanism, an actuator mechanism, in which a motor is used, may be employed instead of the manual operation mechanism.

Next, the operation of the first embodiment conducted in the above constitution will be explained below. First, an outline of the operation of the entire air conditioning unit 10 will be explained as follows. FIG. 1 and FIG. 6, which will be described later, show a state at the time of the face mode operation. The first 25f and the second sealing portion 25g of the first rotary door 25 respectively come into elastic contact with the sealing faces 28, 30 on the case side.

Due to the foregoing, the communication of the inner space of the gate-shape of the first rotary door 25 with the outer space of the first rotary door 25 is shut off. Therefore, both foot opening portions 22, 23 are shut off from the passage on the upstream side of the door by the first rotary door 25.

At this time, the first rotary door 25 completely opens the communication passage opening portion 27 and makes the inner space of the gate-shape of the first rotary door 25 accomplish communication between the space on the air mixing portion 19 side with the communicating passage opening portion 27.

On the other hand, in the second rotary door 26, the first sealing portion 26f and the second sealing portion 26g respectively come into elastic contact with the sealing faces 34, 32 on the case side. Due to the foregoing, the defroster opening portion 20 is completely closed by the second rotary door 26, and the face opening portion 21 is completely opened.

Due to the foregoing, air on the air mixing portion 19 side, that is, cooled air from the evaporator 13 directly flows into the communication passage opening portion 27 and passes through the inner space of the first rotary door 25 and flows into the communication passage opening portion 27. This conditioned air from the communication passage opening portion 27 blows out only from the face opening portion 21 to the upper half of the body of the passenger in the vehicle compartment. At the time of the face mode, the vehicle room is cooled when cold air, cooled by the evaporator 13, is blown out to the upper half of the body of the passenger.

Figure 6B:
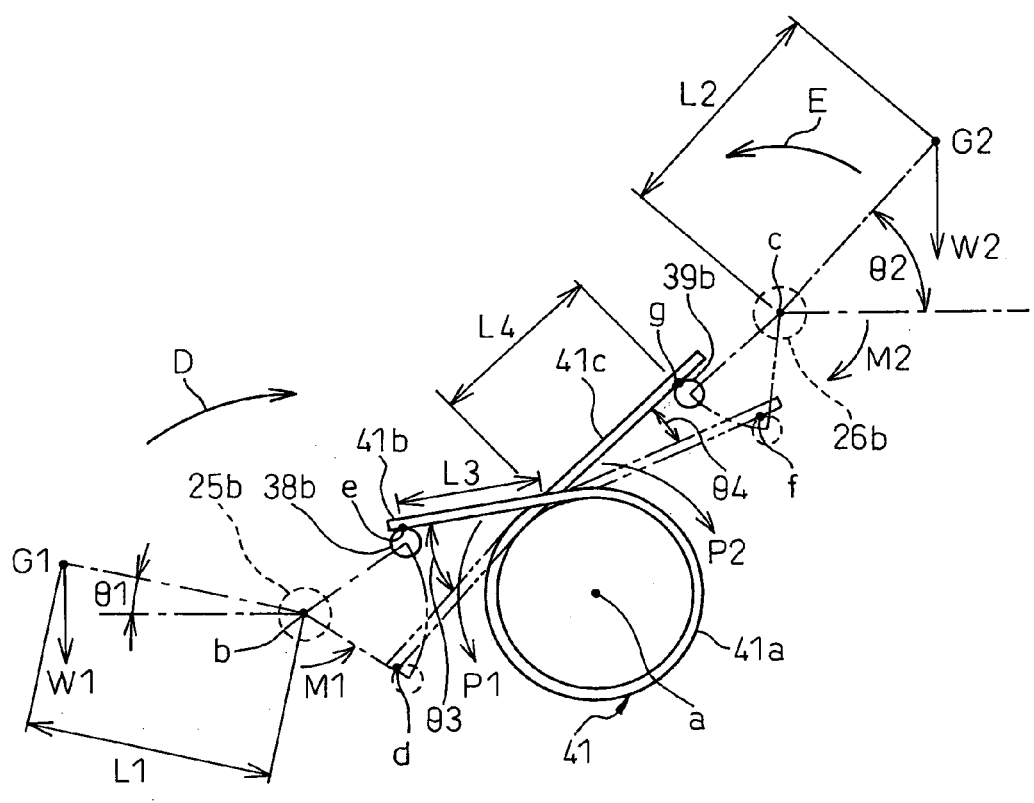
FIG. 6B is a schematic illustration in which only a relation between the load, which is caused by the door self-weight in FIG. 6A, and the spring load is shown being enlarged.
Figure 7:
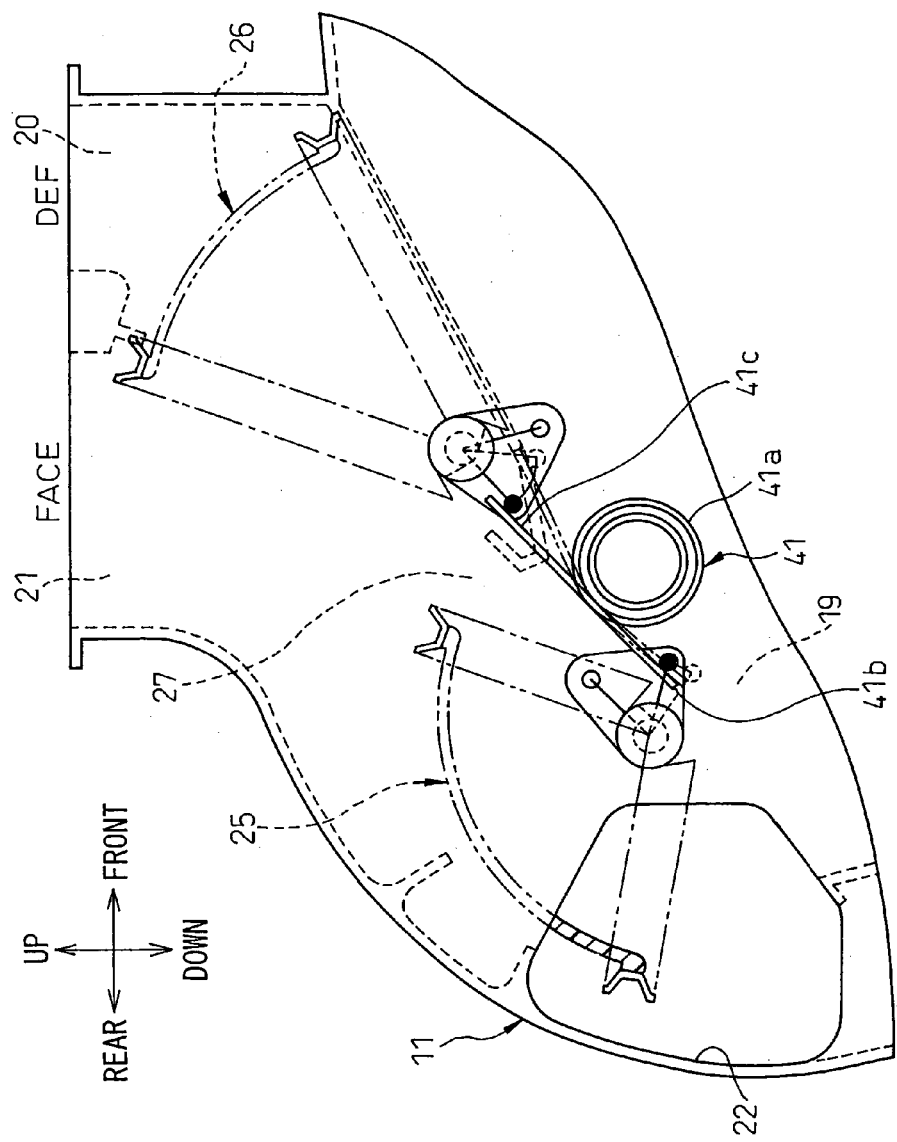
FIG. 7 is a side view showing a primary portion of the air conditioning unit at the time of the bilevel mode in the first embodiment.

Next, FIG. 7 is a view showing a state at the time of the bilevel mode operation. The first rotary door 25 rotates clockwise by a predetermined angle from the position shown in FIGS. 1 and 6, and both the inlet passage of the foot portion 22, 23 and the communication passage opening portion 27 are simultaneously opened. On the other hand, the second rotary door 26 is maintained at the same position as the position at the time of the face mode, so that only the face opening portion 21 can be opened.

Accordingly, air in the air mixing portion 19 can be blown out from both foot portions 22, 23 to the feet of the passenger in the vehicle compartment. At the same time, air in the air mixing portion 19 can be blown out from the face opening portion 21 to the upper half of the body of the passenger in the vehicle compartment.

Figure 8:
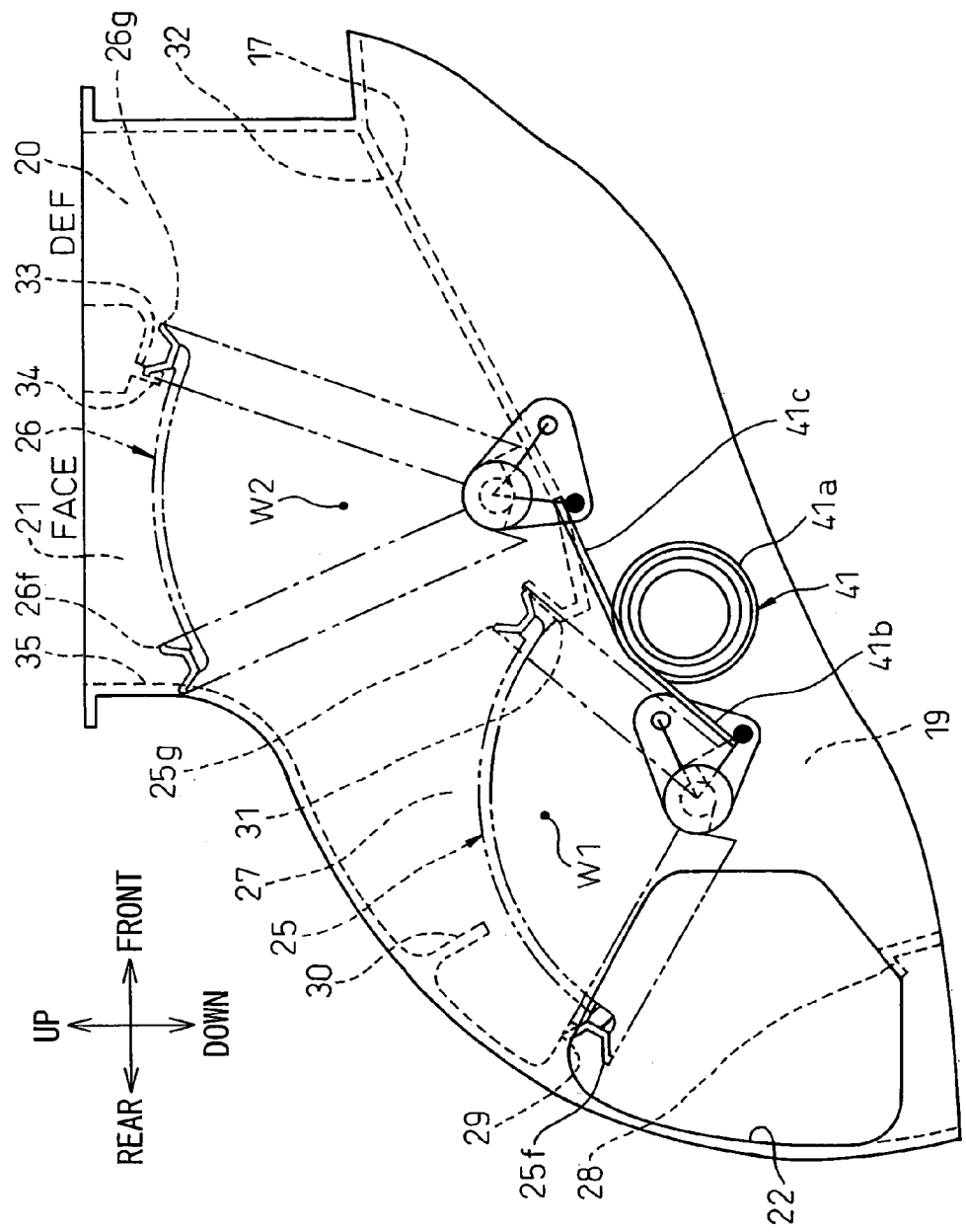
FIG. 8 is a side view showing a primary portion of the air conditioning unit at the time of the foot mode in the first embodiment.

Next, FIG. 8 is a view showing a state at the time of the foot mode operation. The first rotary door 25 further rotates clockwise by a predetermined angle from the position shown in FIG. 7, and the first 25f and the second sealing portion 25g of the first rotary door 25 respectively come into elastic contact with the sealing faces 29, 31 on the case side. Due to the foregoing, the first rotary door 25 completely opens the inlet passage of both foot portions 22, 23 and completely closes the communication passage opening portion 27.

Accordingly, all air in the air mixing portion 19 can be blown out from both foot portions 22, 23 onto the feet of the passenger in the vehicle compartment. At the time of foot mode, the vehicle compartment is heated when hot air heated by the heater core 15 is blown out onto the foot side of the passenger.

In this connection, at the time of the foot mode operation, the second rotary door 26 is rotated counterclockwise by a predetermined angle from the position shown in FIGS. 1, 6 and 7, and the first sealing portion 26f and the second sealing portion 26g of the second rotary door 26 respectively come into elastic contact with the sealing faces 35, 33 on the case side. Due to the foregoing, the face opening portion 21 is completely closed by the second rotary door 26, and the defroster opening portion 20 is completely opened. However, as the communicating passage opening portion 27 is completely closed, no air is blown out from the defroster opening portion 20.

Figure 9:
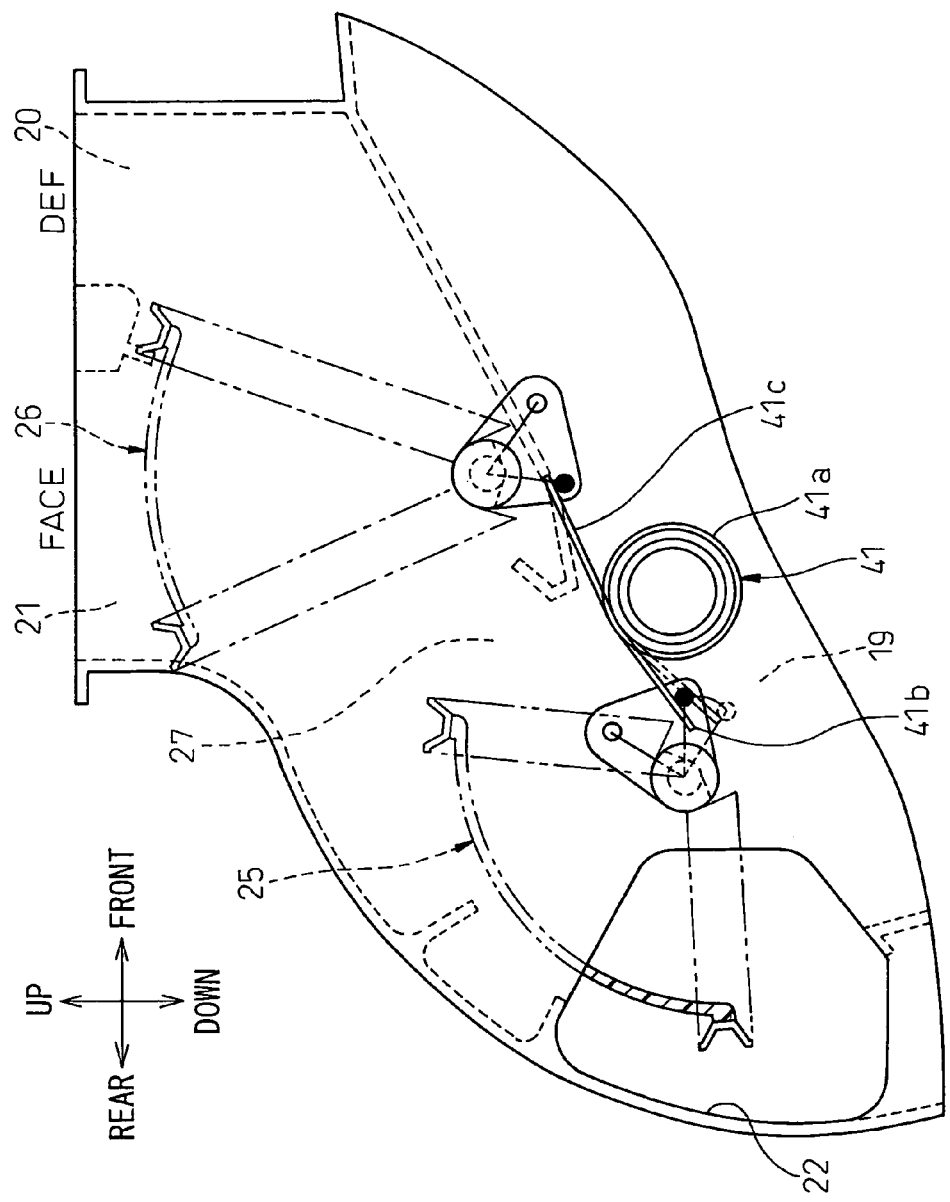
FIG. 9 is a side view showing a primary portion of the air conditioning unit at the time of the foot defroster mode in the first embodiment.

Next, FIG. 9 is a view showing a state of the foot defroster mode operation. The first rotary door 25 is rotated counterclockwise by a predetermined angle from the position shown in FIG. 8 and returned to the same position as that shown in FIG. 7. Due to the foregoing, the inlet passage of both foot opening portions 22, 23 and the communication passage opening portion 27 are simultaneously opened.

On the other hand, as the second rotary door 26 maintains the same position as that shown in FIG. 8, the face opening portion 21 is completely closed and the defroster opening portion 20 is completely opened.

Accordingly, air in the air mixing portion 19 and, to be specific, hot air heated by the heater core 15 is blown out from both foot opening portions 22, 23 onto the feet of the passenger in the vehicle compartment. At the same time, hot air can be blown out from the defroster opening portion 20 to the inside of the windshield of the vehicle. As a result, in the time of the foot defroster mode operation, the vehicle compartment can be heated, and the windshield of the vehicle can be simultaneously prevented from being misted.

Figure 10:
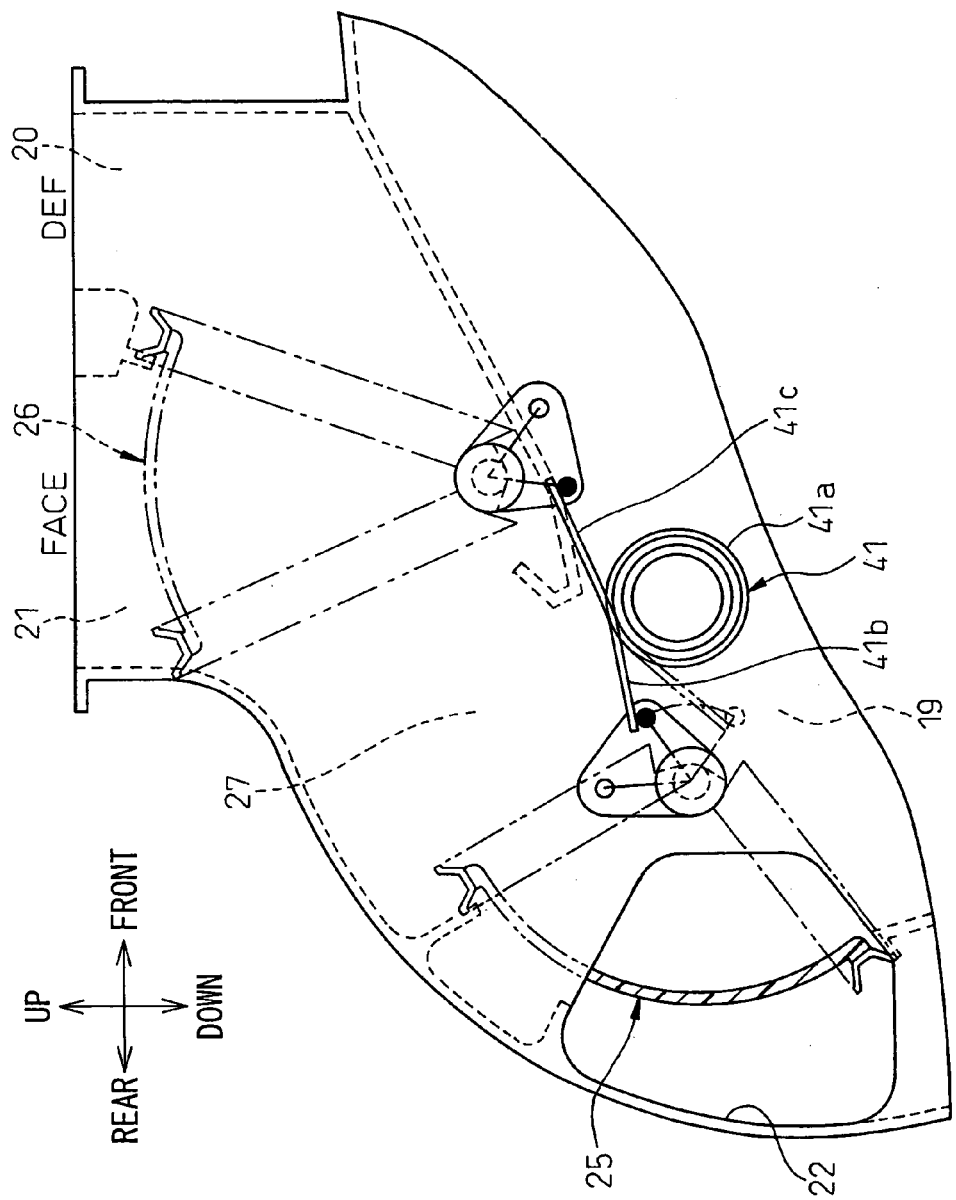
FIG. 10 is a side view showing a primary portion of the air conditioning unit at the time of the defroster mode in the first embodiment.

Next, FIG. 10 is a view showing a state at the time of defroster mode operation in which the first rotary door 25 is further rotated counterclockwise by a predetermined angle from the position shown in FIG. 9 and returned to the same position as that shown in FIGS. 1 and 6. Due to the foregoing, the inlet passage of both foot opening portions 22, 23 are completely closed and the communicating passage opening portion 27 is completely opened. On the other hand, as the second rotary door 26 maintains the same position as that shown in FIGS. 8 and 9, the face opening portion 21 is completely closed and the defroster opening portion 20 is completely opened.

Accordingly, all the air in the air mixing portion 19 can be blown out from the defroster opening portion 20 to the inside of the windshield of the vehicle. This blown air is the dehumidified air, which is cooled by the evaporator 13, or the hot air heated by the heater core 15. As a result, the defrosting action on the windshield of the vehicle can be maximized.

In this connection, in any blowing mode described above, when a ratio of the volume of hot air to the volume of cold air is adjusted by adjusting a rotary position of the air mixing door 14, the temperature of air blown into the vehicle compartment can be arbitrarily adjusted.

The blowing mode can be switched between the face mode and the defroster mode described above when the rotary position of the blowing mode link plate 42 is selected by the blowing mode door operating mechanism not shown in the drawing. That is, according to a change in the rotary position of the blowing mode link plate 42, the engaging position of the first cam groove 42d with the drive pin 38c of the lever 38 and the engaging position of the second cam groove 42e with the drive pin 39c of the lever 39 are changed. Due to the foregoing, the rotary positions of the levers 38, 39 are changed and, further, the rotary positions of the first 25 and the second rotary door 26 are changed. Therefore, the blowing mode can be switched as described above.

According to the present invention, only when one fork-shaped spring 41 is used, an increase in the door operating force of operating two rotary doors 25, 26 can be excellently suppressed. The suppressing action of suppressing the door operating force by this fork-shaped spring 41 will be described in detail referring to FIGS. 6A and 6B.

FIG. 6A is a view showing a relation between the loads W1, W2, which are given by the self-weights of the two rotary doors 25, 26 and the loads P1, P2 of the fork-shaped spring 41 at the time of the face mode shown in FIG. 1. FIG. 6B is an enlarged view showing a relation between the loads W1, W2 given by the self-weights of the two rotary doors and the loads P1, P2 of the spring shown in FIG. 6A.

As shown in FIG. 6B, the center "a" of the circular coil portion 41a of the fork-shaped spring 41 is set at a position close to the intermediate position of the rotary shafts 25b, 26b of the first 25 and the second rotary door 26, and portions close to the forward end portions of the arm portions 41b, 41c of both end portions of the fork-shaped spring 41 are contacted with the pushing pins 38b, 39b of the levers 38, 39.

In FIG. 6B, the solid line positions of the spring pushing pins 38b, 39b are positions at the time of the face mode. At the time of the face mode, the positions of the centers of gravity of the first 25 and the second rotary door 26 are G1 and G2. The load W1 and W2 given by the door self-weights respectively act on these positions of the centers of gravity G1 and G2.

Therefore, in the first rotary door 25, the axial moment M1 is generated by the distance L1, which is between the rotary shaft center b and the position of the center of gravity G1, and by the angle θ1 with respect to the horizontal face. In the same manner, in the second door 26, the axial moment M2 is generated by the distance L2, which is between the rotary shaft center c and the position of the center of gravity G2, and by the angle θ2 with respect to the horizontal face.

Accordingly, when the first rotary door 25 is rotated in the direction D opposite to the direction of the axial moment M1, an intensity of the door operating force is increased by the influence of the axial moment M1. In the same manner, when the second rotary door 26 is rotated in the direction E opposite to the direction of the axial moment M2, an intensity of the door operating force is increased by the influence of the axial moment M2.

Therefore, the spring load P1, which acts in the direction opposite to the direction of the axial moment M1, is set for the first rotary door 25, and the spring load P2, which acts in the direction opposite to the direction of the axial moment M2, is set for the second rotary door 26. Due to the foregoing, the axial moment M1, M2 caused by the door self-weights is canceled, and an increase in the intensity of the door operating force can be suppressed.

In FIG. 6B, the two-dotted chain line positions of the pushing pins 38b, 39b of the levers 38, 39 are positions at the time of the foot mode operation, and reference marks d and f are contact points (spring acting points) at which the arm portions 41b, 41c at the time of the foot mode operation and the spring pushing pins 38b, 39b are contacted with each other. Reference marks e and g are contact points (spring acting points) at which the arm portions 41b, 41c at the time of the face mode operation and the pushing pins 38b, 39b are contacted with each other.

In this embodiment, at the time of the foot mode operation (shown in FIG. 8), the centers in the circumferential direction of the first 25 and the second rotary door 26 are located close to the perpendicular line. Therefore, the positions of the centers of gravity G1, G2 of the first 25 and the second rotary door 26 are located close to the perpendicular line. Therefore, at the time of the foot mode operation, the axial moment M1, M2 caused by the influence of the door self-weight can be made to be zero.

Therefore, it is arranged that the fork-shaped spring 41 can be set at the initial state (the state in which the spring is free) at the contact points d and f at the time of the foot mode. In this way, the spring loads P1, P2 are made to be zero at the contact points d and f.

When the pushing pins 38b, 39b are rotated by a predetermined angle from the two-dotted chain line position to the solid line position, the contact points d and f are transferred to the contact points e and g, and the spring arm portions 41b, 41c are pushed by the pushing pins 38b, 39b. Due to the foregoing, the spring arm portions 41b, 41c are elastically deformed and the above spring loads P1, P2 are generated.

In this case, the spring loads P1, P2 are determined by the length L3, L4 of the spring arm portions 41b, 41c at the contact points e, g, and are also determined by the rotary angles θ3, θ4 and the spring constants. Therefore, the lengths L3, L4, the rotary angles θ3, θ4 and the spring constants are determined so that the spring load P1 can substantially agree with the load W1 caused by the door self-weight described before and so that the spring load P2 can substantially agree with the load W2 caused by the door self-weight described before.

As the shapes of the two levers 38, 39 for driving the doors are designed to be the same, the lengths L3, L4 and the rotary angles θ3, θ4 are determined so that the precondition, in which the shapes of these levers are the same, can be satisfied.

As described above, by a simple structure in which only one fork-shaped spring 41 is used, an increase in the intensity of the door operating force, which is caused by the self-weights of the two rotary doors 25, 26, can be excellently suppressed.

In this case, the arm portions 41b, 41c of both end portions of the fork-shaped spring 41 only come into contact with the outer circumferential faces of the pushing pins 38b, 39b of both levers 38, 39, that is, the arm portions 41b, 41c of both end portions of the fork-shaped spring 41 are not fixed to the outer circumferential faces of the pushing pins 38b, 39b of both levers 38, 39.

Therefore, according to the rotary dislocations of both levers 38, 39, the spring pushing pins 38b, 39b and the arm portions 41b, 41c can come into a relative sliding contact with each other, and the contact positions between them can be changed. Due to the foregoing, even when both levers 38, 39 are rotationally dislocated, there is no possibility that the arm portions 41b, 41c are forcibly deformed, and it becomes possible to smoothly exhibit an action to cancel the door weight.

Figure 11:
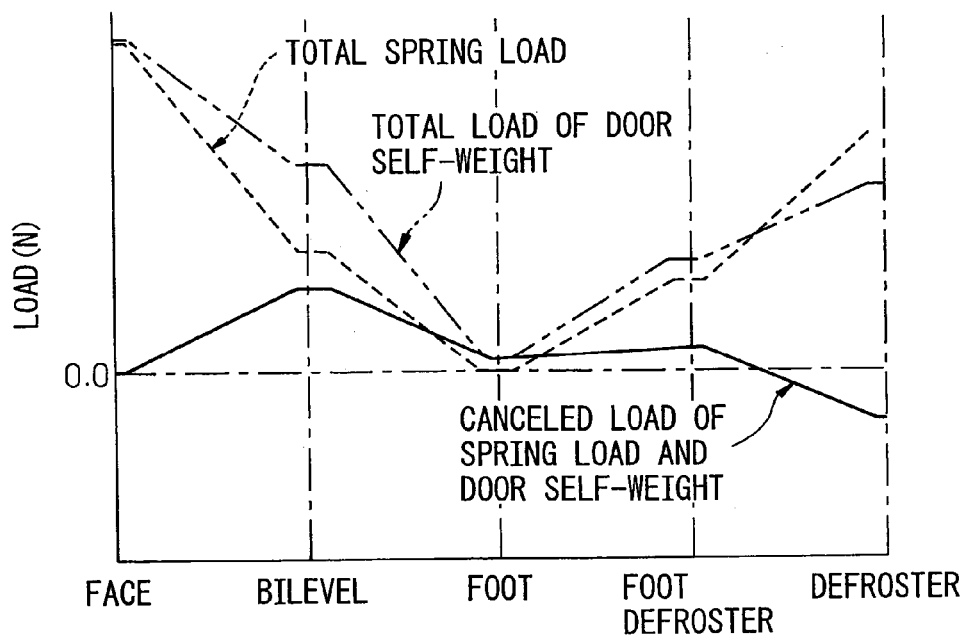
FIG. 11 is a graph showing an effect of canceling the door self-weight in the first embodiment.

FIG. 11 is a graph showing a relation between the door self-weight canceling action and the switching operation of the blowing mode in the present embodiment. The axis of abscissas represents a blowing mode including the face mode to the defroster mode, and the axis of ordinates represents a load.

In FIG. 11, "the total load caused by the door self-weight", which is shown by the two-dotted chain line, is a total value of the door weights W1 and W2 described before, "the total load shown by the broken line" is a total value of the spring loads P1 and P2 described before, and "the cancel load of the spring load and the door self-weight" is a load obtained after the total load of the door self-weight has been canceled by the spring load.

At the time of the face mode operation, both positions G1, G2 of the centers of gravity of two rotary doors 25, 26 are moved to the closest positions to the horizontal plane, and the total load (W1+W2) of the door self-weights is maximized. At the time of the foot mode operation, both positions G1, G2 of the centers of gravity of two rotary doors 25, 26 are moved to the closest positions to the perpendicular line, and the total load (W1+W2) of the door self-weights is minimized.

Therefore, at the time of the face mode operation, the spring total load (P1+P2) is set at the same value (the maximum value) as (W1+W2). At the time of the foot mode operation, the spring is set in the initial state, so that the spring total load (P1+P2) is set at zero.

In the bilevel mode, the foot defroster mode and the defroster mode, the rotary positions of two rotary doors 25, 26 are located at the intermediate position between the face mode and the foot mode. Accordingly, the total load (W1+W2) caused by the door self-weights becomes an intermediate value. As the spring total load (P1+P2) is an intermediate value in these blowing modes, the total load caused by the door self-weights can be successfully canceled.

As a result, as shown by the solid line in FIG. 11, the load obtained after the total load, which is caused by the door self-weights, and the spring total load are canceled by each other can be suppressed to a sufficiently low value (a half or a very small value) through all the blowing modes.

Second Embodiment

In the first embodiment, the blowing mode changing door is composed of the rotary doors 25, 26 in which the outer circumferential door faces 25e, 26e are arranged in portions distant from the centers of the rotary shafts 25a, 25b, 26a, 26b by a predetermined distance to the outside in the radial direction and these outer circumferential door faces 25e, 26e are rotated in the direction perpendicular to the direction of the air flow. However, in the second embodiment, as shown in FIG. 12, the blowing mode changing door is composed of the cantilever plate doors 250, 260.

The cantilever plate doors 250, 260 include flat plate door bodies 251, 261, and the rotary shafts 252, 262 are integrally composed at the end portions of the plate door bodies 251, 261. The plate door body 251 and the rotary shaft 252 are formed into one body by means of resin molding, and the plate door body 261 and the rotary shaft 262 are also formed into one body by means of resin molding.

The first cantilever plate door 250 corresponds to the first rotary door 25 of the first embodiment and opens and closes the inlet passage of both foot opening portions 22, 23 and the communicating passage opening portion 27. The second cantilever plate door 260 corresponds to the second rotary door 26 of the first embodiment and opens and closes the face opening portion 21 and the defroster opening portion 20.

In the cantilever plate doors 250, 260, the flat plate door bodies 251, 261 are rotated round the rotary shafts 252, 262 and resist a current of air. Therefore, the cantilever plate doors 250, 260 are characterized in that they are greatly affected by the wind pressure compared with the rotary doors 25, 26.

In FIG. 12, the inlet passage of both foot opening portions 22, 23 is completely closed by the first cantilever plate door 250, and the communicating passage opening portion 27 is completely opened. Further, the defroster opening portion 20 is completely closed by the second cantilever plate door 260, and at the same time the face opening portion 21 is completely opened. That is, FIG. 12 shows a state of the face mode operation.

In this state, the pushing load W1 acts on the first cantilever plate door 250 due to the wind pressure $V_a$ of the air current flowing to the face opening portion 21 from the air mixing portion 19. Therefore, on the first cantilever plate door 250, an axial moment M1 is generated with respect to the door length L1 by this pushing load W1.

Accordingly, when the first cantilever plate door 250 is rotated from the solid line position in FIG. 12 toward the two-dotted chain line position, the axial moment M1 acts in a direction opposite to the rotary direction of the first cantilever plate door 250. Therefore, the intensity of the operating force of operating the first cantilever plate door 250 is increased.

Therefore, the arm portion 41*b* of the fork-shaped spring 41 is pushed and elastically deformed by the spring pushing pin 38*b* of the lever 38, which corresponds to the lever 38 of the first embodiment, connected to the rotary shaft 252 of the first cantilever plate door 250, and the spring load P1, the direction of which is opposite to the direction of the pushing load W1, is generated at the contact point e of the arm portion 41*b*.

Due to the foregoing, the influence of the air pressure $V_a$ with respect to the operating force of operating the first cantilever plate door 250 can be canceled by the spring load P1.

On the other hand, the second cantilever plate door 260 is arranged on the downstream side of the air current with respect to the first cantilever plate door 250. At the operating position at the time of the face mode operation shown in FIG. 12, the plate face of the second cantilever plate door 260 and the air current become substantially parallel to each other. Therefore, the second cantilever plate door 260 is not affected by the wind pressure.

Instead of that, the load W2 caused by the self-weight acts on the position G2 of the center of gravity of the second cantilever plate door 260, and the axial moment M2 is generated according to this load W2 caused by the self-weight. Accordingly, when the second cantilever plate door 260 is rotated from the solid line position in FIG. 12 toward the two-dotted chain line position, the axial moment M2 acts in the direction opposite to the rotary direction of the second cantilever plate door 260. Accordingly, an intensity of the second cantilever plate door 260 can be increased.

Therefore, the arm portion 41*c* of the fork-shaped spring 41 is pushed and elastically deformed by the pushing pin 39*b* of the lever 39, which corresponds to the lever 39 of the first embodiment, connected to the rotary shaft 262 of the second cantilever plate door 260, and the spring load P2, the direction of which is opposite to the direction of the load W2 caused by the self-weight, is generated at the contact point g of the arm portion 41*c*.

Due to the foregoing, an influence of the self-weight with respect to the operating force of the second cantilever plate door 260 can be canceled by the spring load P2.

In this connection, when the first cantilever plate door 250 is moved to the two-dotted chain line position at which the communicating passage opening portion 27 is completely closed, the pushing pin 38*b* of the lever 38 is moved to the two-dotted chain line position (the position the contact point d side). At this position, the pushing load caused by the wind pressure acting on the first cantilever plate door 250 and the load caused by the door self-weight are canceled to each other.

Accordingly, at the two-dotted position of the first cantilever plate door 250, the arm portion 41*b* of the fork-shaped spring 41 is set at the initial state (the free state), so that the spring load P1 can be made to be zero.

When the second cantilever plate door 260 is operated to the two-dotted chain line position at which the face opening portion 21 is completely closed, the spring pushing pin 39*b* of the lever 39 is moved to the two-dotted chain line position (the position on the contact point f side). At this door position, the pushing load caused by the wind pressure acting on the second cantilever plate door 250 and the load caused by the door self-weight are canceled to each other.

Accordingly, at the two-dotted position of the second cantilever plate door 260, the arm portion 41*c* of the fork-shaped spring 41 is set at the initial state (the free state), so that the spring load P2 can be made to be zero.

As described above, in the second embodiment, the blowing mode door is composed of the cantilever plate doors 250, 260. Accordingly, the influence of the wind pressure and the influence of the self-weight of the door with respect to the door operating force are canceled by the spring load, so that the intensity of the door operating force can be reduced.

Another Embodiment (1) The present invention may be applied to the constitution in which the rotary doors 25, 26 of the first embodiment and the cantilever plate doors 250, 260 of the second embodiment are combined with each other.

(2) In the first and the second embodiment, the present invention is applied to the blowing mode door for opening and closing the blowing opening portion provided in the air conditioner for vehicle use. However, as long as the device is an air passage opening and closing device having a plurality of wind passage opening and closing door means, the present invention is not limited to the air conditioner for vehicle use. It is possible to apply the present invention to various purposes.

While the invention has been described by reference to specific embodiments chosen for purposes of illustration, it should be apparent that numerous modifications could be made thereto, by those skilled in the art, without departing from the basic concept and scope of the invention.

The invention claimed is:

1. An air passage opening and closing device comprising:
a plurality of air passages; and two air passage opening and closing doors respectively capable of being rotated round a rotary shaft so as to open and close the plurality of air passages, the air passage opening and closing device further comprising a fork-shaped spring means arranged at a position between a rotary shaft of one of the air passage opening and closing doors and a rotary shaft of the other of the air passage opening and closing doors, wherein a spring load of one arm portion of the fork-shaped spring means acts on one of the two air passage opening and closing doors so that a load caused by the door self-weight or a load caused by wind pressure can be canceled, and a spring load of the other arm portion of the fork-shaped spring means acts on the other of the two air passage opening and closing doors so that a load caused by the door self-weight or a load caused by wind pressure can be canceled.

2. An air passage opening and closing device according to claim 1, further comprising:

two levers respectively connected to the rotary shafts of the two air passage opening and closing doors so as to respectively rotate the two air passage opening and closing doors; and two pins respectively provided in the two levers, wherein one arm portion is contacted with one of the two pins, the other arm portion is contact with the other of the two pins, and when the two pins are rotated according to the rotation of the two levers, one and the other arm are pushed and elastically deformed to generate the spring loads.

3. An air passage opening and closing device according to claim 2, further comprising a common link plate for giving a rotary operating force to the two levers, wherein a rotary shaft of the link plate is arranged concentrically with a circular coil portion of the fork-shaped spring means.

4. An air passage opening and closing device according to claim 3, wherein a cylindrical attaching boss portion is provided in a case in which the plurality of air passages are formed and the two air passage opening and closing doors are built, a rotary shaft of the link plate is pivotally attached to an inner circumference of the attaching boss portion, and the circular coil portion is attached to an outer circumference of the attaching boss portion.

5. An air passage opening and closing device according to claim 4, wherein the case is made of resin, and the attaching boss portion is formed integrally with the case.

6. An air passage opening and closing device according to claim 4, wherein one end side in the axial direction of the circular coil portion is supported by a root portion of the attaching boss portion, and the other end side in the axial direction of the circular coil portion is supported by a spring presser portion formed on the link plate.

7. An air passage opening and closing device according to claim 3, wherein a step portion for correcting a dislocation existing between the drawing positions of both arm portions caused by the length in the axial direction of the circular coil portion is formed in one of both arm portions.

8. An air passage opening and closing device according to claim 1, wherein the shapes of the two levers are the same.

9. An air passage opening and closing device according to claim 1, wherein the two air passage opening and closing doors are composed of rotary doors which, respectively, have an outer circumferential door face located at a position distant by a predetermined distance from the center of the rotary shaft to the outside in the radial direction, and the outer circumferential door face rotates in the direction perpendicular to the air current.

10. An air passage opening and closing device according to claim 1, wherein the two air passage opening and closing doors are respectively composed of a cantilever plate door with the rotary shaft arranged at an end portion of the plate door body portion.

11. An air conditioning device for vehicle use comprising an air passage opening and closing device according to claim 1, wherein the air passage opening and closing device includes a plurality of the blowing opening portions from which air is blown out to different portions in a vehicle compartment as the plurality of air passages, and the two air passage opening and closing doors are composed as blowing mode doors to open and close the plurality of the blowing opening portions.

* * * * *